United States Patent [19]

Wingler et al.

[11] 4,137,389
[45] Jan. 30, 1979

[54] LOW-MOLECULAR WEIGHT ACRYLATE RESINS AND A PROCESS FOR THEIR PRODUCTION

[75] Inventors: Frank Wingler, Leverkusen; Josef Pedain, Cologne; Walter Uerdingen, Leverkusen, all of Germany

[73] Assignee: Bayer Aktiengesellschaft, Leverkusen-Bayerwerk, Germany

[21] Appl. No.: 871,248

[22] Filed: Jan. 23, 1978

[30] Foreign Application Priority Data

Jan. 27, 1977 [DE] Fed. Rep. of Germany ....... 2703311

[51] Int. Cl.$^2$ ............................ C08F 2/00; C08F 4/38; C08F 16/12
[52] U.S. Cl. .................................... 526/86; 260/31.6; 260/857 VN; 260/859 R; 526/87; 526/228; 526/232; 526/317; 526/318; 526/320; 526/329.2; 526/329.6; 526/332; 526/333
[58] Field of Search .................... 526/73, 78, 86, 87, 526/320, 332, 333, 293, 317, 318, 273, 329.2, 329.6

[56] References Cited

U.S. PATENT DOCUMENTS

| | | | |
|---|---|---|---|
| 3,028,367 | 4/1962 | O'Brien | 260/77.5 |
| 3,753,958 | 8/1973 | Wingler et al. | 526/320 |
| 3,865,904 | 2/1975 | Wingler et al. | 526/304 |
| 3,935,173 | 1/1976 | Ogasawara et al. | 526/320 |
| 3,957,741 | 5/1976 | Rembaum et al. | 526/320 |

OTHER PUBLICATIONS

Polymer Handbook, Ed. Brandrup/IMMERGUT II-1 to II-53.
Organic Peroxides vol. 1, Swein Ed., pp. 81–87.

*Primary Examiner*—Herbert J. Lilling
*Attorney, Agent, or Firm*—Connolly and Hutz

[57] ABSTRACT

A process for the production of a crosslinkable low-molecular weight acrylic resin containing hydroxyl-groups and having a low-molecular consistency factor by the radical bulk copolymerization of (A) 0 to 30 parts by weight of a hydroxyalkyl ester of acrylic acid or methacrylic acid or mixtures thereof;

(B) 0 to 60 parts by wt. of styrene or a substituted styrene or methyl methacrylate or mixtures thereof;

(C) 10 to 90 parts by weight of an acrylic acid ester or of a methacrylic acid ester with 2 to 12 carbon atoms in the alcohol radical or mixtures thereof;

(D) 0 to 30 parts by weight of an $\alpha,\beta$-monoolefinically saturated mono- or di-carboxylic acid with 3 to 5 carbon atoms or of a maleic acid semiester or mixtures thereof or reaction products thereof with a monoglycidyl compound, in the presence of 10 to 70 parts by weight of a monoallyl ether of an at least trihydric alcohol, the sum of the parts by weight of all the monomers A - E amounting to 100, wherein the indicated quantity of monomer E is initially introduced and, at temperatures above 100° C, monomers A to D together with 0.5 to 6% by weight, based on A to D, of an initiator with a half-life period at 100 to 160° C of 0.01 to 100 minutes, are introduced over a period of 1 to 6 hours and polymerized, at least 98% by weight of the monomers A to D and from 36 to 95% by weight of monomer E being converted. Acrylate resins of this type are eminently suitable for the production of readily processable binder mixtures which although low in viscosity, have a very high solids content.

2 Claims, No Drawings

LOW-MOLECULAR WEIGHT ACRYLATE RESINS AND A PROCESS FOR THEIR PRODUCTION

This invention relates to crosslinkable low molecular weight acrylate resins containing hydroxyl groups and having a low molecular inconsistency factor, and to a process for their production. Acrylate resins of this type are eminently suitable for the production of readily processible binder mixtures which, although low in viscosity, have a very high solids content.

Crosslinkable copolymers containing hydroxyl groups which can be processed with melamine resins or polyisocyanates to form weatherproof coatings are already known. In the motor vehicle lacquering field, it is preferred to use polymers based on acrylic or methacrylic esters. These binders may be applied either in the form of solutions or in the form of powders (cf. U.S. Pat. No. 3,753,958). The increasing demands for pollution control have necessitated the development of solvent-free or low-solvent binder systems.

Although no solvents are required for electrostatic powder lacquering, this lacquering technique has created new processing problems which do not occur in conventional lacquering with solutions. Particular reference is made here to the danger of dust explosions, to the often relatively poor levelling properties, to the relatively high stoving temperatures and to the need for extensive re-investment. In addition, the reproducible adjustment of defined colours often gives rise to considerable technical difficulties. Accordingly, greater interest has recently been shown in the other low-pollution development, i.e. solids-rich binder systems. In their case, attempts are made to combine the highest possible concentrations of binder in solvents or in reactive diluents with low viscosities.

German Offenlegungsschrifts Nos. 2,218,836 and 2,262,588 describe processes for the production of hydroxyl-group-containing polymethacrylates and polyacrylates having a low molecular weight and a relatively narrow molecular weight distribution. Production is carried out in two stages in which esters of methacrylic acid or acrylic acid are first anionically polymerised with alkali metal alcoholates in the presence of alcohols, after which the relatively low molecular weight products thus obtained are transesterified with diols or polyols. According to German Offenlegungsschrifts Nos. 2,218,836 and 2,262,588, anionic polymerisation with alkali metal alcoholates allows the homopolymerisation of methacrylic or acrylic acid esters and the copolymerisation of two methacrylic acid esters or two acrylic acid esters. No examples are given of the copolymerisation of an acrylic acid ester with a methacrylic acid ester. In addition, copolymerisation with acrylic or methacrylic acid or styrene or substituted styrenes is not possible where alkali metal alcoholates are used. In the case of polymethacrylic esters in particular, the transesterification reaction requires high temperatures and long reaction times which make the process uneconomical and, in addition, result in discolouration of the products. The hydroxyl groups cannot be introduced by anionic copolymerisation with oxyalkyl esters of acrylic or methacrylic acid because their OH-groups interfere with the polymerisation reaction.

It is known from German Auslegeschrift No. 1,121,811 that hydroxy alkyl(meth)acrylates and alkyl(meth)acrylates can be polymerised in the presence of less than 10% by weight of a catalyst forming free radicals and in the presence of an organic thiol as molecular weight regulator in a solvent at temperatures in the range of from 100° to 150° C. The copolymers are said to have average molecular weights of from 500 to 3000 and a relatively narrow molecular weight range. The Applicants of German Auslegeschrift No. 1,121,811 subsequently point out in the later German Offenlegungsschrift No. 2,262,588 (cf. page 2, paragraph (2) that these processes are generally unuseable either because they require high temperatures and pressures for carrying out the polymerisation reaction or because chain-transfer agents used in the reaction are evil-smelling or toxic or because the properties of the polymer produced in the polymerisation reaction are impaired by fragments of the initiators or chain-transfer agents used. In addition, it is difficult to control the molecular weight distribution of polymers produced by the free radical technique. Accordingly, polymers such as these would tend to have a wide molecular weight distribution and would contain considerable quantities of polymers of high and very low molecular weight which could give rise to unsatisfactory properties in the polymer compositions. Data to this effect may be found in German Offenlegungsschrift No. 2,212,836, page 2, paragraph 2.

These disclosures were confirmed by our own experiments as reported in German Auslegesschrift No. 1,121,811. Even when high concentrations of molecular weight regulators, such as tert.-dodecyl mercaptan for example, and at the same time high polymerisation temperatures are used, it is not possible to produce acrylate resins containing hydroxyl groups which are suitable for the production of high-solids, low-viscosity binder mixtures. The poor suitability of the products thus obtained would appear to be primarily attributable to their high molecular inconsistency factor.

The inconsistency factor U is defined by the equation:

$$U = (M_w/M_n) - 1$$

in which $M_w$ is the weight average and $M_n$ is the number average of the molecular weight. The products produced with addition of relatively large quantities of regulators have inconsistency factors of the order of 2 to 10. It is known to the expert that products with the same average molecular weight (number average $M_n$), but with a different molecular inconsistency factor have different solution viscosities. The product with the greater inconsistency factor always has a higher solution viscosity because high molecular weight fractions make a much greater contribution towards viscosity than the same quantity of low molecular weight fractions. In addition, a wide molecular weight distribution means that the number of reactive groups per molecular and hence the reactivity of the individual chains show considerable differences.

An object of the present invention is to produce crosslinkable acrylate resins containing hydroxyl groups for high-solid binders which have a viscosity in solution in ethyl glycol acetate at room temperature of less than 100 poises and preferably less than 50 poises, for example even with a solids content of 70% by weight, and which are free from evil-smelling molecular weight regulators or toxic and evil-smelling initiator fragments. After they have been crosslinked, the products obtained are intended to give highgloss films and coatings combining extreme hardness with high elasticity. The average functionality of the chains should be greater than 1 and preferably greater than 2. The functionality also establishes the lower limit to the molecular weight which lies at around 500.

According to the invention, this object is achieved by carrying out the radical chain polymerisation of acrylic monomers and/or styrene monomers in bulk at temperatures above 100° C. and preferably at temperatures above 130° C. in the presence of a monoallyl ether of a polyhydric alcohol and more especially in the presence of trimethylol propane monoallyl ether. The present invention also relates to the specially composed lacquer resins and to the high-solids solutions.

Accordingly, the present invention provides a process for the production of an acrylic resin by the radical bulk copolymerisation of (A) 0 to 30 parts by weight of hydroxyalkyl ester of acrylic acid or methacrylic acid with 2 to 4 carbon atoms in the hydroxyalkyl radical or mixtures thereof;

(B) 0 to 60 parts by weight of styrene, α-methyl styrene, o-chlorostyrene, p-chlorostyrene, o-, m- or p-methyl styrene, p-tert.-butyl styrene or methyl methacrylate or mixtures thereof;

(C) 10 to 90 parts by weight of an acrylic acid ester with 1 to 12 carbon atoms in the alcohol radical or of a methacrylic acid ester with 2 to 12 carbon atoms in the alcohol radical or mixtures thereof;

(D) 0 to 30 parts by weight of an α,β-monoolefinically unsaturated mono- or di-carboxylic acid with 3 to 5 carbon atoms or of a maleic acid semiester with 2 to 14 carbon atoms in the alcohol radical or mixtures thereof or reaction products thereof with a monoglycidyl compound, in the presence of (E) 10 to 70 parts by weight of a monoallyl ether of an at least trihydric alcohol, the sum of the parts by weight of all the reactants A to E amounting to 100, wherein the above-mentioned quantity of monomer E is initially introduced and, at temperatures above 100° C. and preferably at temperatures of from 130° to 160° C., monomers A to D together with from 0.5 to 6% by weight, based on A to D, of an initiator with a half life at 100° C. to 160° C. of from 0.01 to 100 minutes, are introduced over a period of 1 to 6 hours and polymerised, at least 98% by weight of monomers A to D and from 36 to 95% by weight of monomer E being converted.

Preferred monomers A to D are:

$A_1$ 0 to 20 parts by weight of 2-hydroxyethyl acrylate, 2-hydroxyethyl methacrylate, 2-hydroxypropyl acrylate, 2-hydroxypropyl methacrylate, 4-hydroxybutyl (meth)acrylate or mixtures thereof;

$B_1$ 20 to 60 parts by weight of styrene or methyl methacrylate or mixtures thereof;

$C_1$ 10 to 40 parts by weight of butyl acrylate, butyl methacrylate, 2-ethylhexyl acrylate or 2-ethylhexyl methacrylate or mixtures thereof, and $D_1$ 0.5 to 5 parts by weight or acrylic acid, methacrylic acid or maleic acid semiester with 4 to 8 carbon atoms in the alcohol component, in the presence of $E_1$ 10 to 60 parts by weight of trimethylol propane monoallyl ether, the sum of the parts by weight of A–E amounting to 100.

The monomers A to D are incorporated into the copolymer in substantially the same ratios in which they are used for the polymerisation reaction, these copolymerised units being substantially statistically distributed.

By contrast, the monoallyl ether E is not incorporated into the polymer in the ratio in which it was initially introduced in relation to the monomers A to D. It is still partially present in monomeric form after the polymerisation reactions (5 to 64% by weight of the quantity used).

The present invention also relates to the products obtained by the process according to the invention, i.e. 55.2 to 99.5% by weight solutions of crosslinkable acrylic resins containing hydroxyl groups of copolymerised statistically distributed units (A.B.C.D.) of A. 0 to 48.5% by weight of a hydroxyalkyl ester of acrylic acid or methacrylic acid with 2 to 4 carbon atoms in the hydroxyalkyl radical or mixtures thereof;

B. 0 to 74.2% by weight of styrene, α-methyl styrene, o-chlorostyrene, o-, m- or p-methyl styrene, p-tert.-butyl styrene or methyl methacrylate or mixtures thereof;

C. 10.4 to 96.1% by weight of an acrylic acid ester with 2 to 12 carbon atoms in the alcohol radical or mixtures thereof;

D. 0 to 48.7% by weight of an α,β-monoolefinically unsaturated mono- or di-carboxylic acid with 3 to 5 carbon atoms or of a maleic acid semiester with 2 to 14 carbon atoms in the alcohol radical or mixtures thereof or reaction products thereof with a monoglycidyl compound; and units incorporated into the copolymer of E. 3.8 to 66.5% by weight of a monoallyl ether of an at least trihydric polyalcohol, the sum of the percentages by weight of all reactants A to E amounting to 100, in a monomeric monoallyl ether of an at least trihydric alcohol, distinguished by the fact that the polymer of the components A–E, free from monomeric monoallyl ether has an average molecular weight ($M_n$), as measured by vapour pressure osmosis in acetone, of from 500 to 3000, preferably from 800 to 1600, and a hydroxyl content of from 2 to 9% by weight, and the copolymer (100% by weight) containing monallyl ether has a viscosity, in the form of a 70% by weight solution in ethyl glycol acetate, of from 3 to 100 poises and preferably from 10 to 50 poises at a temperature of 25° C.

The new copolymers according to the invention are unequivocally defined by the above-mentioned characteristics.

It is preferred to use 61.6 to 99.5% by weight solutions of crosslinkable hydroxyl-group-containing acrylic resins of copolymerised statistically distributed units ($A_1$, $B_1$, $C_1$, $D_1$) of $A_1$ 0 to 24.5% by weight of 2-hydroxyethyl acrylate 2-hydroxyethyl methacrylate, 2-hydroxypropyl acrylate, 2-hydroxypropyl methacrylate, 4-hydroxybutyl acrylate or 4-hydroxybutyl methacrylate or mixtures thereof;

$B_1$ 20.6 to 74% by weight of styrene or methyl methacrylate;

$C_1$ 10.4 to 53.5% by weight of butyl acrylate, butyl methacrylate, 2-ethylhexyl acrylate or 2-ethylhexyl methacrylate or mixtures thereof;

$D_1$ 0.51 to 20% by weight of acrylic acid, methacrylic acid or maleic acid semiester with 4 to 8 carbon atoms in the alcohol component, and units incorporated into the copolymer of $E_1$ 3.8 to 58.7% by weight of trimethylol propane monoallyl ether, the sum of the percentages of weight of $A_1$–$E_1$ amounting to 100, in monomeric trimethylol propane monoallyl ether.

The monomers of group A are used for incorporating the chemically reactive hydroxyl groups. The monomers of group B polymerised on their own give polymers with a high glass transition temperature of from 70° C. to 110° C. Preferred monomers of group A are 2-hydroxyethyl acrylate, 2-hydroxypropyl acrylate, 2-hydroxyethyl methacrylate, 2-hydroxypropyl methacrylate, 4-hydroxybutyl acrylate and 4-hydroxybutyl methacrylate. Of the monomers of group B, styrene and/or methyl methacrylate are particularly preferred.

The monomers of group C are used for elasticising the resins and, as homopolymers, represent elastic products with glass transition temperatures in the range of from +40° C. to −80° C. Examples of monomers belonging to group C are methyl acrylate, ethyl (meth)acrylate, n or isopropyl (meth)acrylate, butyl (meth)acrylate, isobutyl (meth)acrylate, tert.-butyl (meth)acrylate and 2-ethylhexyl (meth)acrylate. It is preferred to use butyl methacrylate, butyl acrylate and 2-ethylhexyl (meth)acrylate.

The incorporation of the acid monomers of group D leads to an increase in the reactivity or functionality of the polymers. Monomers of group D are acrylic acid, methacrylic acid, maleic acid, monoesters of maleic acid with aliphatic alcohols containing from 4 to 8 carbon atoms, itaconic acid and fumaric acid. These monomers may be reacted with glycidyl compounds, such as glycidol or glycidol esters of monocarboxylic acids containing from 8 to 20 carbon atoms, preferably from 10 to 16 carbon atoms, before, during or after the polymerisation reaction.

Suitable monoallyl ethers of at least trihydric polyalcohols are the monoallyl ethers of trimethylol propane, glycerol, 1,2,4-butane triol and 1,2,6-hexane triol. The monoallyl ethers may contain up to 3% by weight of corresponding diallyl ethers.

At least 36% by weight of the monoallyl ether of the at least trihydric polyalcohol used is incorporated into the polymer. It was surprising to find that, in the presence of the monoallyl ethers which can only be poorly copolymerised with the acrylates and/or styrene and in the absence of chain transfer agents such as mercaptans or halogen compounds, it is possible using relatively small quantities, i.e. from 0.5 to 6.0% by weight and preferably from 2 to 5% by weight, based on monomers A to D, of initiators decomposing into radicals to obtain lacquer resins which, by virtue of their low solution viscosity, are eminently suitable for use as high-solids binders and, after crosslinking with added lacquer hardeners, give films and coatings with outstanding gloss, elasticity and hardness. It is known that allyl ethers only copolymerise poorly with acrylic monomers and/or styrene.

In the case of the process according to the invention, it is not known in what way the monoallyl ethers are incorporated. One particular advantage of the process is that the proportion of allyl ether incorporated into the polymer does not have to be separated off. According to investigations by gas chromatography, the degree of incorporation amounts to between 36 and 95% by weight. It was surprising to find that, by polymerising the described monomer combination A to D in the presence of the allyl ether, it is possible to produce low molecular weight lacquer resins of low solution viscosity and that non-incorporated monoallyl ether has no adverse effect upon the properties of the resins.

The process is best carried out by initially introducing the allyl ether, heating it to the required temperature and introducing the monomers A to D together with the initiator over a period of from 1 to 6 hours.

Initiators suitable for carrying out the process according to the invention are compounds which decompose thermally into radicals in a first order reaction. Suitable initiators should have half life periods of the radical decomposition process of from 100 to 0.01 minute at a temperature in the range of from 100° to 160° C.

Initiators of this type are, for example, symmetrical aliphatic azo compounds such azoisobutyronitrile, azo-bis-2-methyl valeronitrile, 1,1'-azo-bis-1-cyclohexane nitrile and 2,2'-azo-bis-isobutyric acid alkyl ester; symmetrical diacyl peroxides such as, for example acetyl, propionyl or butyryl peroxide, bromine-, nitro-, methyl- or methoxylsubstituted benzoyl peroxides and also lauroyl peroxide; symmetrical peroxy dicarbonates such as, for example, diethyl, diisopropyl, dicyclohexyl and dibenzyl peroxy dicarbonate; tert.-butyl peroctoate or tert.-butyl phenyl peracetate; also peroxy carbamates such as tert.-butyl-N-(phenylperoxy)-carbamate or tert.-butyl-N-(2,3- or 4-chlorophenyl-peroxy)-carbamate; other peroxides are tert.-butyl hydroperoxide, di-tert.-butyl peroxide, cumene hydroperoxide and dicumyl peroxide.

If desired, the polymerisation reaction may even be carried out in the presence of a reactive diluent. Reactive diluents are liquid compounds which, after the polymerisation reaction, harden together with the acrylate binder to form solid coatings with addition of polyisocyanate, urea or melamine resins. These compounds are diols or polyols which can be used in quantities of from 20 to 80% by weight, based on monomers A–E.

The hydroxyl groups may be arranged terminally or in other positions. During hardening, the reactive diluent reacts through its hydroxyl groups with the crosslinking agent and remains in the film. In addition, the reactive diluent is generally saturated and does not react with the monomers under the polymerisation conditions.

Particularly suitable reactive diluents are diols, triols, and polyols, polyethers with two or more hydroxyl groups, hydroxyl-terminated polyesters and polylactones.

Preferred diols which may be used as reactive diluents include glycols of the formula $HO(CH_2)_nOH$, where $n = 2$–10, glycols of the formulae $HO(CH_2CH_2O)_nH$ and $HO(CH(CH_3)CH_2O)_nH$, where n = 1 to 40, such as ethylene glycol, butane diol, propylene glycol, di- and poly-ethylene glycol, di- and poly-propylene glycol, also 2,2-dimethyl-1,3-propane diol, 2,2-diethyl-1,3-propane diol, 3-methyl-1,5-pentane diol, 2,2-diethyl-1,3-propanediol, 3-methyl-1,5-pentane diol, N-methyl- and N-ethyl-diethanolamine, 4,4'-methylene-bis-cyclohexanol, 4,4'-isopropylidene-bis-cyclohexanol and various xylene diols, hydroxymethyl phenethyl alcohols, hydroxymethyl phenyl propanols and heterocyclic diols, such as 1,4-piperazine diethanol.

Preferred diols are 2-methyl-2-ethyl-1,3-propane diol, 2-ethyl-1,3-hexane diol and 2,2-dimethyl-3-hydroxypropyl-2,2-dimethyl-3-hydroxypropionate.

Preferred ester diols are (2-ethyl-1,3-hexane diol)-(2-ethyl)-hydroxyhexanoate, (2,2-dimethyl-1,3-propane diol)-mono-(2-methyl)-2-propyl hydroxy propionate and (dimethylol-1,3-propane diol)-mono-2,2-dimethyl-(3)-hydroxy propionate.

Preferred triols are trimethylol propane, trimethylol ethane, glycerol, 1,2,4-butane triol, 1,2,6-hexane triol, and also lactone triols based on trimethylol propane and caprolactone.

Polyethers suitable for use as reactive diluents may be obtained by reacting polyols preferably containing from 2 to 10 carbon atoms and an alkylene oxide, such as ethylene oxide, propylene oxide, butylene oxide or a mixture of these oxides. The polyethers containing hydroxyl groups thus obtained may optionally be modified with carboxylic acid anhydrides or carboxylic acids. If the reaction of polyols, such as ethylene glycol, propylene glycol, diethylene glycol or similar polyols, with dicarboxylic acids, such as succinic acid, maleic acid, fumaric acid, adipic acid, phthalic acid, isophthalic acid, tetrachlorophthalic acid or other dicarboxylic acids containing from 4 to about 12 carbon atoms, or with the carboxylic acid anhydrides derived from these compounds, is carried out with a molar excess of polyol, polyesters containing free hydroxyl groups which are also suitable for use as reactive diluents are obtained.

The hydroxyl-group-containing copolymers incorporating monomeric monoallyl ethers produced by the process according to the invention are distinguished by the particularly low viscosity of their solutions. The molecular inconsistency factors of the preparations were determined by gel permeation chromatography (GPC) on styra gels with tetrahydrofuran (THF) as eluent. The average molecular weight values $M_w$ and $M_n$ are determined from the distribution of the chromatograms after establishing a universal standard relation (in accordance with Z. Grubisic, P. Rempp and H. Benoit, J. Polymer Sci., Part B, Polymer Letters 5 (1967) 753). The axial dispersion of molecularly consistent substances which is dependent upon the measuring apparatus used was determined on compounds such as glycerol stearate and taken into consideration during evaluation.

Products free from monomeric allyl ether produced by the process according to the invention have inconsistency factors $(M_w/M_n) - 1$ of from 0.5 to 2.0 and preferably from 0.8 to 1.5. On completion of the polymerisation reaction and before removal of the residual monomers A–B and solvents, the polymers may be modified by known processes, for example by reaction with glycidol or glycidol esters, caboxylic acid anhydrides, such as phthalic acid anhydride, by esterification or transesterification with carboxylic acids or carboxylic acid esters, such as benzoic acid, ethyl hexanoic acid, fatty acids or oleic acid. Certain properties, such as pigment compatibility, adhesion and resistance to alkalis, can be improved by this modification.

After they have been produced, the resins may be freed from readily volatile constituents, such as residual monomers A–E, and catalyst residues at temperatures of from 140° to 200° C. This may be done either under normal pressure in coil evaporators by blowing in an inert gas, such as nitrogen or steam, in quantities of from 0.1 to 1 m³ per kg of resin melt or in vacuo in evaporation apparatus such as falling-film evaporators, thin-layer evaporators, screw evaporators, flash evaporators or spray evaporators. The still hot liquid resin melt may optionally be mixed in a further process step, carried out continuously or in batches, with from 20 to 500 parts by weight on one or more reactive diluents per 100 parts by weight of polymer. Mixing is carried out in mixing screws, kneaders, on mixing rolls, in stirrer-equipped vessels or preferably in tubes with fittings which promote admixture.

Conventional lacquer additives, such as levelling agents based on cellulose esters, oligoalkylacrylates, silicone oils, plasticisers such as phosphoric acid esters, phthalic acid esters or adipic acid, viscosity-controlling additives, such as bentonites and silicic acid esters, matting agents, hardening accelerators such as manganese, lead or cobalt naphthenates and also tin accelerators, calcium salts, bases such as diazabicyclooctane, acids such as phosphoric acid, ethanolic hydrochloric acid, tartaric acid or citric acid, may be added to the mixtures in quantities of from 0.1 to 30% by weight, based on the resin/reactive diluent mixture. The necessary spraying viscosities may be adjusted by dilution with known lacquer solvents, such as aromatic hydrocarbons, petrols, esters, ketones, alcohols or glycol esters, to solids contents of from 60 to 80% by weight.

Diisocyanates and polyisocyanates or aminoplast resins may be used for crosslinking the high-solids binder mixtures according to the invention.

The diisocyanates or polyisocyanates are used in such quantities that there are from 0.2 to 5 isocyanate groups for every hydroxyl group in the binder mixture.

It is possible to use aliphatic, cycloaliphatic or aromatic polyisocyanates, such as hexamethylene diisocyanate, 1-methyl-2,4-diisocyanatocyclohexane, isophorone diisocyanate, 4,4'-diisocyanatodicyclohexyl methane, tolylene-2,4-diisocyanate, o-, m- and p-xylylene diisocyanate, 4,4'-diisocyanatodiphenyl methane or 1,5-naphthylene diisocyanate, masked isocyanates or mixtures thereof.

It is also possible to use modified polyisocyanates containing ester groups, ether groups, urethane groups, urea groups, isocyanate groups, allophanate groups, carbodiimide groups and biuret groups, or even polyisocyanates modified by telomerisation reactions of the type described, for example, in German Offenlegungsschrifts Nos. 1,720,747 and 2,031,408.

It is preferred to use polyisocyanates containing urethane groups and/or biuret groups of the type formed from the commercially readily available diisocyanates, namely 2,4- and 2,6-tolylene diisocyanate, hexamethylene-1,6-diisocyanate, 1-isocyanatomethyl-5-isocyanato-1,3,3-trimethylcyclohexane, 4,4'-diisocyanatodicyclohexyl methane and 4,4'-diisocyanatodiphenyl methane.

It is particularly preferred to use polyisocyanates containing biuret groups of the type described, for example, in German Pat. No. 1,101,394.

Suitable aminoplast resins are the known reaction products of aldehydes, particularly formaldehyde, with substances containing several amino or amido groups, such as for example malamine, urea, N,N'-ethylene urea, dicyanodiamide or benzoguanamine which may be completely or partly etherified with monoalcohols on the methylol group.

The copolymers obtained in accordance with the invention may be used in combination with diisocyanates or polyisocyanates, aminoplast resins or other components capable of reacting with the hydroxyl or carboxyl groups in the copolymer for the production of lacquer binders which may in turn be used for the production of coatings or impregnations on metal, wood, masonry, concrete, glass, ceramics, plastics or textile materials, including paper.

One particularly preferred application for binders produced from the acrylate resins according to the invention is the surface lacquering of motor vehicles, in which case the lacquers are distinguished by their particular depth, high gloss and outstanding resistance to weather.

The percentages quoted in The Examples represent percent by weight unless otherwise indicated.

The molecular weights were determined by vapour pressure osmometry in acetone.

EXAMPLES I TO 5

The quantities of trimethylol propane monoallyl ether indicated in Table 1 are initially introduced under nitrogen into a 3-liter stirrer-equipped vessel. The monoallyl ether contains approximately 3% by weight of trimethylol propane diallyl ether as an impurity. The contents of the vessel are heated while stirring to 135° C., after which the monomer mixture (A to D) specified in Table 1, together with the initiator, are introduced over a period of 2 hours, during which the temperature is kept at 135° C. After stirring for 1 hour, the volatile constituents, such as residual monomer A-D, and catalyst decomposition products are removed by blowing in nitrogen. After the analysis samples have been removed, a 70% by weight solution is prepared by stirring in ethyl glycol acetate. The molecular weights $\bar{M}n$ and the inconsistency factors in Table 1 relate to monoallyl ether-free copolymers of the monomers A to E.

Application Examples 6 to 10

The quantities of the individual components indicated in Table 2, except for the isocyanate component, are intensively mixed and diluted with EGA in such a way that the mixtures thus obtained all have a flow-out time (according to DIN 53 211, 4mm orifice) of 25 seconds. After the isocyanate component has been stirred in in the quantities indicated, the mixtures may be sprayed using a conventional lacquering apparatus. The processing time is 3 to 4 hours. Explanations to Table 2:

EGA = ethyl glycol acetate

Product A = alkyld resin of approximately 20% of α-ethyl hexane carboxylic acid, 40% of trimethylol propane, 30% of phthalic acid, 8% of adipic acid and 2% of maleic acid Product B = reaction product of 1 mole of trimethylol propane and 6 moles of propylene oxide, Product C = copolymer of 70% of 2-ethyl hexyl acrylate and 30% of ethyl acrylate, Pendulum hardness I after drying for 30 minutes at 80° C. Pendulum hardness II after ageing for 24 hours at 60° C. Deformability (Erichsen indentation) determined on lacquer films with a thickness of 50 μ after ageing for 24 hours at 60° C. in accordance with DIN 53 156

Product D = polyisocyanato biuret containing 3 isocyanate groups obtained by reacting hexamethylene diisocyanate with tert.-butanol.

Table 2

| Application Example | 6 | 7 | 8 | 9 | 10 |
|---|---|---|---|---|---|
| Resin of Example No. | 1 | 2 | 3 | 4 | 5 |
| 80% in EGA (g) | 130 | 130 | 60.0 | 100 | 65 |
| 2-ethylene-1,3-hexane diol (g) | — | 20 | — | — | — |
| Product A, 75% in xylene (g) | — | — | 70 | — | 70 |
| Product B (g) | — | — | — | 20 | — |
| TiO$_2$-rutile (g) | 90 | 90 | 80 | 80 | 80 |
| Zn-octoate, 10% in EGA (g) | 10 | 10 | 6 | 6 | 6 |
| Product C, 1% in EGA (g) | 8 | 8 | 7 | 7 | 7 |
| Product D (g) with solids content (% by weight) in EGA | 140 75 | 140 65 | 100 77 | 70 67 | 150 70 |
| Pendulum hardness I according to DIN 53 157 (seconds) | 24 | 120 | 25 | 120 | 105 |
| Pendulum hardness II according to DIN 53 157 (seconds) | 130 | 153 | 126 | 140 | 151 |
| Dryness I according to DIN 53 136 in hours | 35 | 10 | 25 | 5 | 10 |
| Deformability according to DIN 53 156 (mm) | 10 | 8.3 | 9.5 | 9.5 | 8.5 |
| Lattice cut according to DIN 53 151[+] | | | | | |

[+]Lattice cut formation:
the lattice cuts are assessed in accordance with DIN 53 230

Table 1

| Example | 1 | 2 | 3 | 4 | 5 |
|---|---|---|---|---|---|
| Trimethylol propane mono-allyl ether (TMPA) (E) | 1000 | 1000 | 500 | 300 | 500 g |
| Styrene (B) | 800 | — | 500 | 500 | — g |
| Methyl methacrylate (B) | — | 900 | — | — | — g |
| Butyl methacrylate (C) | — | 100 | — | — | 300 g |
| n-butyl acrylate (C) | 200 | — | — | 500 | — g |
| Isobutyl acrylate (C) | — | — | 500 | — | — g |
| tert.-butyl acrylate (C) | — | — | — | — | 700 g |
| Methacrylic acid oxyethyl ester (A) | — | — | — | 50 | — g |
| Acrylic acid (D) | — | — | — | 60 | 15 g |
| tert.-butyl perbenzoate | 10 | 20 | 10 | 10 | 10 g |
| di-tert.-butyl peroxide | — | — | 10 | 10 | 10 g |
| OH-number mg of KOH/g of substance | 322 | 301 | 166 | 103 | 160 |
| acid number | 1 | 2.2 | 1.4 | 26.9 | 9.5 |
| Residual TMPA content (% by weight), based on monomers A-E used | 31.8 | 9.1 | 6.5 | 13.9 | 7.3 |
| Viscosity, 70% in ethyl glycol acetate, in poises at 25° C | 17 | 70 | 10 | 45 | 19 |
| Molecular weight $\bar{M}n$ | 990 | 2200 | 785 | 1800 | 1000 |
| Inconsistency factor ($U_{GPC}$) | 1.4 | 1.3 | 1.4 | 1.5 | 1.2 |

We claim:

1. A process for the production of an acrylic resin, which comprises the radical bulk copolymerisation of
    (A) 0 to 30 parts by weight of at least one hydroxyalkyl ester of acrylic acid or methacrylic acid with 2 to 4 carbon atoms in the hydroxyalkyl radical, or a mixture thereof;
    (B) 0 to 60 parts by weight of styrene, α-methyl styrene, o-chlorostyrene, p-chlorostyrene, o-, m- or p-methyl styrene, p-tert.-butyl styrene or methyl methacrylate, or a mixture thereof;
    (C) 10 to 90 parts by weight of at least one acrylic acid ester with 1 to 12 carbon atoms in the alcohol radical or of at least one methacrylic acid ester with 2 to 12 carbon atoms in the alcohol radical, or a mixture thereof;
    (D) 0 to 30 parts by weight of at least one α,β-monoolefinically saturated mono- or di-carboxylic acid with 3 to 5 carbon atoms or of at least one maleic acid semiester with 2 to 14 carbon atoms in the alcohol radical, or a mixture thereof or a reaction product thereof with a monoglycidyl compound, in the presence of (E) 10 to 70 parts by weight of at least one monoallyl ether of an at least trihydric alcohol, the sum of the parts by weight of all the monomers A–E amounting to 100, wherein the indicated quantity of monomer E is initially introduced and, at a temperature above 100° C., monomers A to D together with 0.5 to 6% by weight, based on A to D, of an initiator, are introduced over a period of 1 to 6 hours and polymerised, at least 98% by weight of the monomers A to D and from 36 to 95% by weight of monomer E being converted.

2. A process as claimed in claim 1, wherein monomers A–D and the initiator are introduced at a temperature of from 130° to 160° C.